United States Patent [19]

Iijima

[11] 4,323,111
[45] Apr. 6, 1982

[54] TEMPERATURE CONTROL DEVICE FOR AUTOMOBILE AIR CONDITIONER

[75] Inventor: Tetsuya Iijima, Tokyo, Japan

[73] Assignee: Nissan Motor Co., Ltd., Yokohama, Japan

[21] Appl. No.: 146,111

[22] Filed: May 2, 1980

[30] Foreign Application Priority Data

May 10, 1979 [JP] Japan .................................. 54-56330

[51] Int. Cl.³ ............................................ F25B 29/00
[52] U.S. Cl. ........................................ 165/25; 165/28; 165/30; 165/43; 62/180
[58] Field of Search ...................... 62/180; 165/16, 24, 165/25, 26, 27, 28, 30, 42, 43, 23

[56] References Cited

U.S. PATENT DOCUMENTS 4,250,956  2/1981  Ohtani .................................. 165/36

Primary Examiner—Albert W. Davis
Assistant Examiner—Margaret A. Focarino
Attorney, Agent, or Firm—Lowe, King, Price & Becker

[57] ABSTRACT

A temperature control device for an automobile air conditioner including an electronic control circuit for regulating air temperature in the automobile, by automatically actuating a temperature regulating element of the air conditioner in response to variations of resistance values of resistive elements representing air temperature in the automobile and operative conditions of the temperature regulating element and a temperature setting element. An adjusting means is provided for modifying the virtual characteristics of the aforesaid resistive elements depending on ON or OFF state of a compressor of the air conditioner, whereby the air temperature in the automobile is controlled at a certain value irrespective of ON or OFF state of the compressor.

4 Claims, 4 Drawing Figures

FIG_3
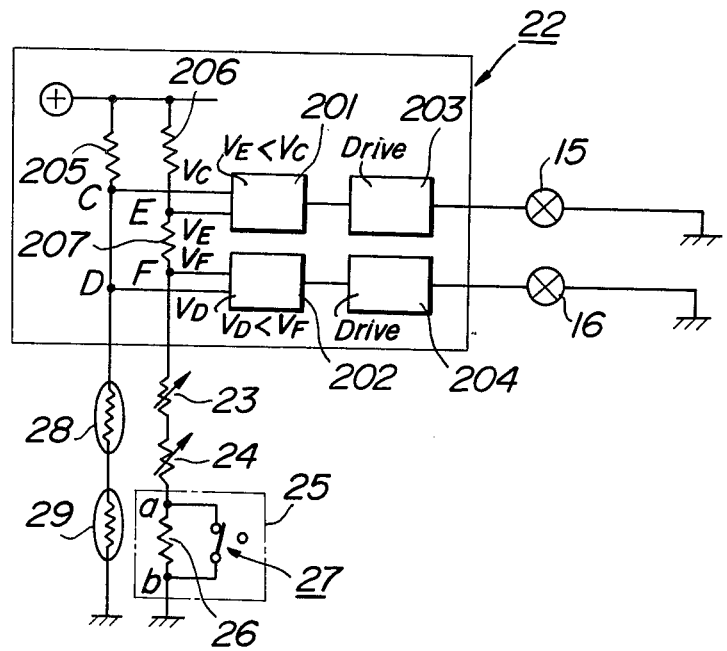
FIG_4
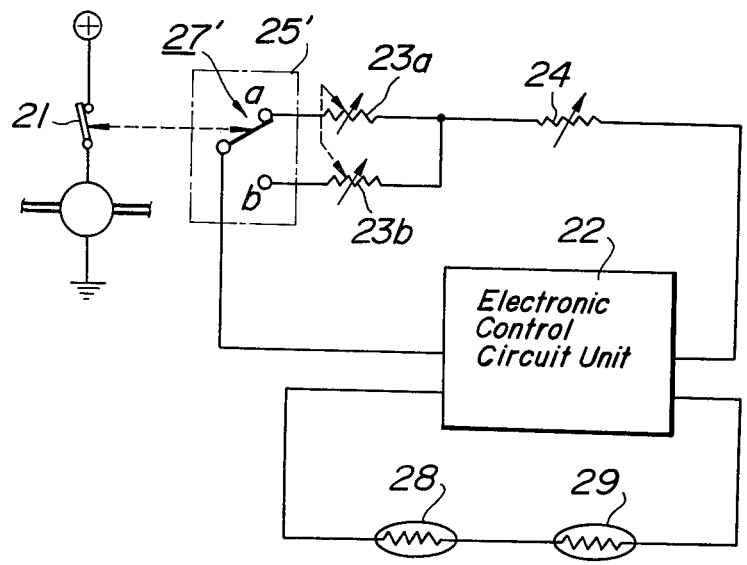

TEMPERATURE CONTROL DEVICE FOR AUTOMOBILE AIR CONDITIONER

BACKGROUND OF THE INVENTION

1. Field of the Invention

The present invention relates to an automobile air conditioner, and more particularly to a temperature control device for an automobile air conditioner having a cooling unit and usable for both heating and cooling.

2. Description of the Prior Art

Heretofore, a temperature control of automatic temperature regulating type has been used with an automobile air conditioner, wherein a temperature regulating element is operated by an actuator in response to variations of three resistance values representing air temperature in the automobile and operative conditions of a temperature setting element and the temperature regulating element so as to keep a certain functional relationship among the three resistance values.

A typical automobile air conditioner has three air outlets; namely, a VENT outlet for blowing out air from a dashboard, a HEAT outlet for blowing air at the feet of persons on automobile seat, and a DEF outlet for blowing air toward a windshield. An outlet-selecting lever is provided on the dashboard, for selectively opening doors at the three outlets, i.e., a VENT door, a HEAT door, and a DEF door, so as to run the air conditioner in a corresponding mode. In the control of the automatic temperature regulating type, the aforesaid doors are automatically switched over for being opened or closed depending on the conditions in the automobile.

The automobile air conditioner of the aforesaid construction is used both for cooling and for heating. An air conditioner switch is provided for stopping the operation of a compressor of a cooling unit thereof and for keeping the cooling unit unoperated when the air conditioner is used only for heating.

As regards the temperature regulation during the operation for heating, there are two methods; namely, a method of heating the air by a heating unit after the air coming through a cooling unit, and a method of mixing the air from the cooling unit with the air from the heating unit. In either of the two methods, even if the temperature setting is fixed, there is a difference in air temperature at the outlet between the time when the cooling unit is operated and the time when the cooling unit is unoperated.

More particularly, for a given mode of operation, the air temperature at the air conditioner outlet when the compressor of the cooling unit is operated tends to be lower than that when the compressor is unoperated. The air temperature in the automobile is balanced at an intermediate point between the outside temperature and the outlet temperature of the air conditioner, where the amount of heat entering from the air conditioner into the inside of the automobile (or heat removed from the inside of the automobile) is equilibrated with the amount of heat leakage from (or into) the automobile due to conduction of the automobile body and ventilation.

Thus, the air temperature in the automobile varies as the temperature at the outlet varies. Accordingly, even if the temperature setting element is set at an optimal value, when for instance the air conditioner switch is turned off after arriving at the optimal temperature, the operation of the compressor of the cooling unit is stopped and the air temperature in the automobile increases. In other words, there is a shortcoming in that the air temperature in the automobile is changed by ON-OFF operation of the air conditioner switch and the re-setting of the temperature setting element becomes necessary.

SUMMARY OF THE INVENTION

Therefore, an object of the present invention is to obviate the aforesaid shortcoming of the prior art, by providing a device for controlling the air temperature substantially constant during solely heating operation of an automobile air conditioner irrespectively of the operation or unoperation of the compressor of a cooling unit of the air conditioner.

To fulfill the object, the device according to the present invention is provided with an adjusting means which is operated in response to ON-OFF operation of an air conditioner switch so as to modify the virtual characteristics of at least one of a sensor representing the air temperature in the automobile and resistive elements representing operative conditions of a temperature regulating element and a temperature setting element. Thus, the present invention provides a temperature control device for an automobile air conditioner whose operating characteristics is not affected by the operating or unoperating condition of the compressor of a cooling unit of the air conditioner.

BRIEF DESCRIPTION OF THE DRAWING

For a better understanding of the invention, reference is made to the acompanying drawing, in which:

FIG. 3 is an electric circuit diagram showing the details of an electronic control circuit in the embodiment of FIG. 2; and FIG. 4 is an electric circuit diagram of an electronic control circuit in another embodiment of the present invention.

DESCRIPTION OF THE PREFERRED EMBODIMENTS

Figure 1:
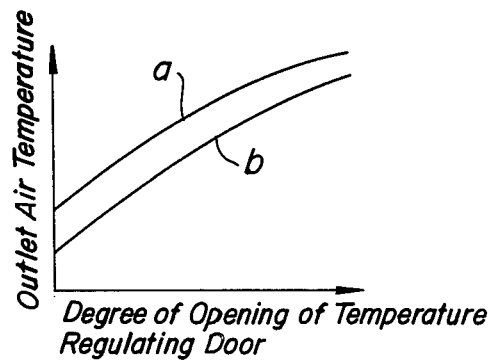
FIG. 1 is a graph showing the relationship between the degree of opening of a temperature regulating door and outlet air temperature.

Referring to FIG. 1 showing characteristic curves in terms of the relationship between the degree of opening of a temperature regulating door and outlet air temperature, the curve a shows the relationship when the compressor of a cooling unit is not operated and the curve b shows the relationship when the compressor is operated. As can be seen from the figure, for a given mode of operation, when the compressor of the cooling unit is operated, the outlet air temperature tends to be lower than that in the case of keeping the compressor unoperated. The present invention is to eliminate the difference between the curve a and the curve b, and to provide temperature control irrespective of the operation or unoperation of the compressor.

Figure 2:
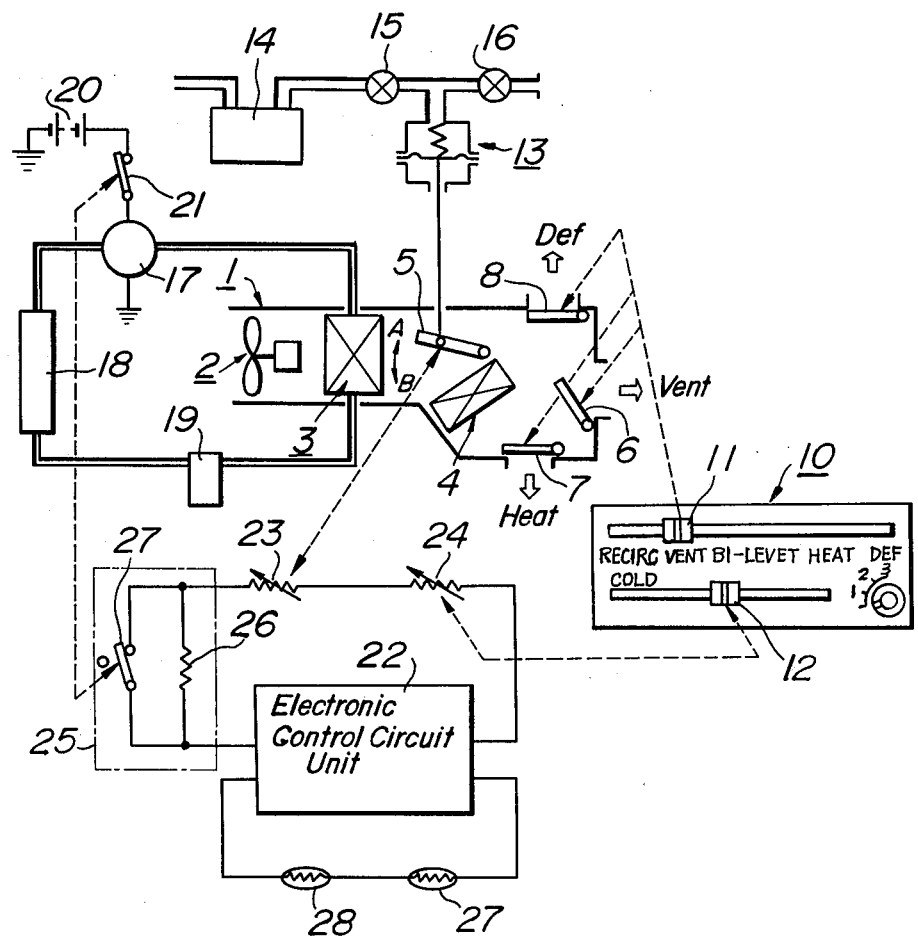
FIG. 2 is a schematic diagram showing the overall construction of an embodiment of the present invention.

Referring to FIG. 2 showing the overall construction of an embodiment of the present invention, the relationship among an air conditioning unit 1, an operating panel 10, an electronic control circuit 22, and a refrigerant circulating system of a cooling unit is illustrated. The air conditioning unit 1 includes a blower 2, an evaporator 3, a heater core 4, a temperature regulating door 5, a VENT outlet door 6, a HEAT outlet door 7, and a DEF outlet door 8. The operating panel 10 is provided with an outlet-selecting lever 11 and a temperature setting lever 12. The outlet-selecting lever 11 can be manually operated to a VENT, HEAT, or DEF position, so as to cause the VENT outlet door 6, the HEAT outlet door 7, or the DEF outlet door 8 to open.

On the other hand, the temperature regulating door 5 is turned by an actuator 13 which controls the degree of opening thereof. The actuator 13 is connected to a vacuum tank 14 through a solenoid valve 15 on the one hand, and also to the open atmosphere through another solenoid valve 16. When the solenoid valve 15 is opened, a negative pressure is applied to the actuator 13 for causing the actuator 13 to move upwardly, so that the temperature regulating door 5 is turned clockwise as shown by the arrow A of FIG. 2. On the other hand, when the solenoid valve 16 is opened, the atmospheric pressure is applied to the actuator 13 for causing the actuator 13 to move downwardly, so that the temperature regulating door 5 is turned counter-clockwise as shown by the arrow B of the figure.

The refrigerant circulating system of the cooling unit includes a compressor 17, a condenser 18, a liquid tank 19, and an evaporator 3. In FIG. 2, a power source 20 is connected to the compressor 17 through an air conditioner switch 21, which switch actuates the compressor 17 through a magnetic clutch (not shown). When the air conditioner switch 21 is turned on for operating the compressor 17, the refrigerant circulates through a path tracing from the compressor 17 through the condenser 18, the liquid tank 19, and the evaporator 3 and back to the compressor 17.

An electronic control circuit unit 22 is connected to a first variable resistor 23 whose resistance value changes with the turning of the temperature regulating door 5, a second variable resistor 24 whose resistance value is set by the temperature setting lever 12, and an adjusting means 25 for modifying the virtual characteristics of the first variable resistor 23 or the second variable resistor 24. The adjusting means 25 has a fixed resistor 26 for adjusting and a changeover switch 27 gang-operated with the air conditioner switch 21. The variable resistors 23 and 24 and the fixed resistor 26 are connected in series to the electronic control circuit unit 22, while the changeover switch 27 is connected in parallel to the fixed resistor 26.

A first thermistor 28 acts as a sensor for detecting the air temperature in the automobile, and a second thermistor 29 acts as a sensor for detecting the air temperature outside the automobile, and the two thermistors 28 and 29 are connected in series to the electronic control circuit unit 22.

In FIG. 3 showing the details of the electronic control circuit unit 22, 201 and 202 are comparator circuits, 203 and 204 are drive circuits, and 205 through 207 are fixed resistors.

In the air conditioner of the aforesaid construction, the blower of FIG. 2 sucks air from the outside or inside the automobile for passing it through the evaporator 3, where the air is cooled. The air from the evaporator 3 is divided by the temperature regulating door 5 depending on the degree of opening thereof, so that a part of the air is passed through the heater core 4 for heating and then mixed with the non-heated portion of the air bypassing the heater core 4 downstream thereof, whereby an air flow of a desired temperature is produced. The air flow is thereafter directed to the outside of the air conditioner unit through the outlet selected by the outlet-selecting lever 11.

If the air conditioner switch 21 is closed, the changeover switch 27 is turned on as shown in FIG. 2, so that the electric circuit across the points a and b is short-circuited. On the other hand, when the air conditioner switch 21 is open, the changeover switch is gang-operated therewith and turned off, so that the fixed resistor 26 for adjustment becomes effective across the points a and b.

Under the conditions as shown in FIG. 2, if the air temperature outside the automobile is constant, the resistance value of the second thermistor 29 is also constant, and if the temperature setting is kept constant, the resistance value of the second variable resistor 24 is constant, too. If such conditions are assumed and the air temperature in the automobile is assumed to be reduced, the resistance value of the first thermistor 28 increases, so that voltages Vc and Vd at points C and D in the circuit of FIG. 3 also increase because the two voltages are determined by the resistance values of the fixed resistor 205 and the first and second thermistors 28 and 29.

On the other hand, voltages Ve and Vf at points E and F of the circuit of FIG. 3 are determined by the resistance values of the fixed resistors 206 and 207 and the variable resistors 23 and 24. As long as Ve is lower than Vc, i.e. Ve<Vc, the comparator circuit 201 produces an output signal for actuating the drive circuit 203, whereby an electric current for opening the solenoid valve 15 is produced. Accordingly, the actuator 13 is raised, and the temperature regulating door 2 is turned clockwise, as shown by the arrow A of FIG. 2, for increasing the temperature of the air flowing into the automobile. The aforesaid turning of the temperature regulating door causes the first variable resistor 23 to be gang-operated for increasing the resistance value thereof, so that the voltage Ve at the point E is raised. If the voltage Ve exceeds the voltage Vc, i.e., Ve>Vc, the comparator circuit 201 ceases to produce its output signal, and the solenoid valve 15 is closed for stopping the temperature regulating door 5 there.

On the other hand, when the air temperature in the automobile rises, the resistance value of the first thermistor 28 is reduced for lowering the voltage Vd at the point D. If the voltage Vd becomes lower than the voltage Vf at the point F, Vf being smaller than the voltage Ve at the point E by the voltage drop across the fixed resistor 207, i.e., Vd<Vf, the comparator circuit 202 produces its output signal which actuates the drive circuit 204 for providing an electric current to open the solenoid valve 16. Whereby, the actuator 13 is lowered, and the temperature regulating door 5 is turned counter-clockwise, as shown by the arrow B of FIG. 2 for lowering the temperature of the air flowing into the automobile. The first variable resistor 23 is gang-operated with the aforesaid counter-clockwise turning of the temperature regulating door 5, so as to reduce the resistance value of the resistor 23. As a result, if the voltage Vf at the point F becomes lower than the voltage Vd, i.e., Vd>Vf, the comparator circuit 202 ceases to produce its output signal, and the solenoid valve 16 is closed for stopping the temperature regulating door 5 there.

Thus, for a resistance value of the first thermistor 28 acting as a sensor of the air temperature in the automobile, a corresponding resistance value of the first variable resistor 23 is determined, so that, for a given air temperature in the automobile, the degree of opening of the temperature regulating door 5 is determined.

It is recalled now, that, as explained in the foregoing by referring to FIG. 1, the outlet air temperature characteristics curve a for the case of unoperating the compressor 17 with the air conditioner switch 21 turned off provides a higher outlet air temperature than that by the characteristics curve b with the compressor operated, for a given degree of opening of the temperature regulating door 5. Therefore, if it is desired to control the outlet air temperature based on the characteristics curve b, a modification or compensation becomes necessary in which the actual temperature setting for a given set positon of the temperature setting lever 12 is lower in the case of the air conditioner switch 21 being turned off than that in the case of said switch 21 being turned on. Since the second variable resistor 24 is adapted to give a higher resistance value for a lower temperature setting, a fixed resistor 26 for modification or compensation is connected in series to the first and second variable resistors 23 and 24 when the air conditioner switch 21 is turned off while gang-operating the changeover switch 27 to its turned off position. Thereby, the virtual resistance value of the second variable resistor 24 is increased, and the increased virtual resistance provides the same effect as the decreasing of the temperature setting by a corresponding amount, so that the outlet temperature characteristics curve a for the case of the compressor 17 being unoperated can be made the same as the corresponding characteristics curve b for the case of the air conditioner switch 21 being turned on (i.e., the compressor 17 being operated).

Alternatively, the characteristics curve a of FIG. 1 for the case of the compressor 17 being unoperated may be produced when the fixed resistor 26 for modification or compensation is connected in series, and the fixed resistor 26 may be shunted as the air conditioner switch 21 is turned on for achieving an effect which is virtually the same as that of reducing the resistance value of the second variable resistor 24, so that the outlet air temperature is raised and the characteristics curve a for the case of the compressor 17 being unoperated can be also achieved even when the compressor 17 is operated.

FIG. 4 shows another embodiment of the electronic control circuit to be used in the present invention. In this embodiment, a first variable resistor means to be operated together with a temperature regulating door 5 includes a pair of gang-operated variable resistors 23a and 23b having different characteristics, and an adjusting means 25' includes a changeover switch 27' to be gang-operated with an air conditioner switch 21. For instance, when the air conditioner switch 21 is turned on and the compressor 17 is operated as shown in the figure, the switch 27' assumes the position of a side a, so that the variable resistor 23a is connected in series to the second variable resistor 24 in the electronic control circuit unit 22. On the other hand, when the air conditioner switch 21 is turned off and the compressor 17 is at rest, the switch 27' assumes the position on a side b, so that the variable resistor 23b is connected in series to the second variable resistor 24 of the electronic control circuit unit 22. The resistance characteristics of the variable resistors 23a and 23b are selected to be such that substantially identical air temperature control in the automobile can be achieved irrespectively of whether the compressor is operated or unoperated.

It is also possible to form the second variable resistor 24 operated by the temperature setting lever 12 with two gang-operated variable resistors, said two gang-operated variable resistors having different resistance characteristics and being selectively used by a changeover switch operated together with the air conditioner switch 21.

Furthermore, the adjusting means 25 in the aforesaid embodiment of the present invention, being actuated together with the air conditioner switch 21 for adjusting the virtual characteristics of the first variable resistor 23 or the second variable resistor 24, can be replaced by a similar adjusting means which adjusts the virtual characteristics of the first thermistor 28 acting as a sensor of the air temperature in the automobile. The same effect as that of the preceding embodiments can be achieved by the replaced adjusting means adjusting the virtual characteristics of the first thermistor 28.

It is noted here that the device usable for the sensor detecting the air temperature in the automobile and the sensor detecting air temperature outside the automobile is not restricted to the thermistor, but other suitable temperature-sensitive resistance elements such as posistors can be of course used therefor. If the temperature-sensitive resistance element used has a positive characteristics, the signal treatment in the electronic control circuit may be reversed from what has been described hereinbefore by referring to the illustrated embodiments.

The air conditioner switch 21 which is referred to in the preceding description of the present invention can be of any practicable form: for instance, a switch mounted on the instrument panel or dadhboard for manual ON-OFF operation by itself; a switch mounted at a separately prepared COOL position for the outlet-selecting lever (or a mode-selecting lever) 11, so as to be turned on as the lever assumes the COOL position; or a switch which is turned on when it is detected that the temperature regulating door 5 assumes a temperature position higher than a predetermined level.

As described in the foregoing, according to the present invention, when an automobile air conditioner is operated solely for heating, the controlled air temperature is kept constant regardless of whether a cooler compressor is operated or unoperated, so that the need of readjusting the temperature setting means each time the air conditioner switch is operated can be eliminated and the operability is greatly improved. Furthermore, the present invention can be applied to a conventional temperature control device by simply adding a resistor and a changeover switch, and it can be manufactured easily and carried out at a low cost.

What is claimed is:

1. A temperature control device for an automobile air conditioner including a plurality of outlets, an outlet-selecting means for selecting said outlets, a temperature regulating means, a temperature setting means, a first variable resistor whose resistance value changes with movement of said temperature regulating means, a second variable resistor whose resistance value changes with the movement of said temperature setting means, a sensor detecting air temperature in an automobile, an actuator for operating said temperature regulating means, an electronic control circuit for operating said actuator so as to obtain that air temperature in the automobile which is set by said temperature setting means while using inputs from said first and second variable resistors and the sensor detecting the air temperature in the automobile, a cooling unit, and an air conditioner switch for actuating a compressor of said cooling unit so as to make the automobile air conditioner usable for cooling and heating, said device characterized by having an adjusting means for adjusting virtual characteristics of one of the first and second variable resistors and said sensor in response to ON-OFF of said air conditioner switch, whereby the set temperature in the automobile is obtained irrespectively of operation and unoperation of said compressor during heating operation.

2. A temperature control device for an automobile air conditioner as set forth in claim 1, characterized in that said adjusting means comprises a resistor connected in series or parallel to one of said first and second variable resistors and said sensor detecting the air temperature in the automobile, and a switch for making and breaking the connection of said resistor in response to ON-OFF operation of said air conditioner switch.

3. A temperature control device for an automobile air conditioner as set forth in claim 1, characterized in that one of said first and second variable resistors consists of a pair of variable resistors having different characteristics, and said adjusting means comprises a switch for changing over one of said pair of variable resistors for connection to said electronic control circuit in response to ON-OFF operation of said air conditioner switch.

4. A temperature control device for an automobile air conditioner as set forth in claim 1, characterized in that said sensor detecting air temperature in the automobile consists of a pair of sensors having different characteristics, and said adjusting means comprises a switch for changing over one of said pair of sensors for connection to said electronic control circuit in response to ON-OFF operation of said air conditioner switch.

* * * * *